US012571516B2

(12) United States Patent
Li

(10) Patent No.: US 12,571,516 B2
(45) Date of Patent: Mar. 10, 2026

(54) LED LIGHT-EMITTING STRUCTURE, LIGHT-EMITTING DEVICE, AND PREPARATION METHOD FOR LIGHT-EMITTING STRUCTURE

(71) Applicant: FuturePulse Investment Co., Ltd., Guangzhou (CN)

(72) Inventor: Wenjie Li, Guangzhou (CN)

(73) Assignee: FuturePulse Investment Co., Ltd., Guangzhou (CN)

(*) Notice: Subject to any disclaimer, the term of this patent is extended or adjusted under 35 U.S.C. 154(b) by 0 days.

(21) Appl. No.: 18/888,333

(22) Filed: Sep. 18, 2024

(65) Prior Publication Data

US 2025/0369590 A1 Dec. 4, 2025

(30) Foreign Application Priority Data

May 30, 2024 (CN) ........................ 202410690981.0

(51) Int. Cl.

*F21Y 105/12* (2016.01)
*F21V 5/00* (2018.01)
*F21Y 105/16* (2016.01)
*F21Y 113/13* (2016.01)
*F21Y 115/10* (2016.01)

(52) U.S. Cl.

CPC ........... *F21V 5/007* (2013.01); *F21Y 2105/12* (2016.08); *F21Y 2105/16* (2016.08); *F21Y 2113/13* (2016.08); *F21Y 2115/10* (2016.08)

(58) Field of Classification Search

CPC .. F21Y 2115/10; F21Y 105/12; F21Y 105/16; F21Y 113/13; F21K 9/00; F21L 4/027
See application file for complete search history.

(56) References Cited

U.S. PATENT DOCUMENTS

| | | | | |
|---|---|---|---|---|
| 2007/0034775 A1* | 2/2007 | Cheng | .................... | H05B 45/40 257/E25.032 |
| 2007/0181896 A1 | 8/2007 | Liaw | | |
| 2009/0101922 A1* | 4/2009 | Lin | ..................... | H01L 25/0753 257/89 |

FOREIGN PATENT DOCUMENTS

| | | |
|---|---|---|
| CN | 110473477 A | 11/2019 |
| CN | 211344992 U | 8/2020 |
| JP | 2022055685 A | 4/2022 |

* cited by examiner

*Primary Examiner* — William J Carter
(74) *Attorney, Agent, or Firm* — Maier & Maier, PLLC

(57) ABSTRACT

An LED light-emitting structure, a light-emitting device, and a preparation method for light-emitting structure. The LED light-emitting structure includes: a base, a conductive portion is arranged on one side of the base; a chip cluster, the chip cluster comprises a plurality of LED chips, the plurality of LED chips include at least two types and are fixedly arranged on another side of the base and connected to the conductive portion; a plurality of the chip clusters are arranged on the base, and the positions of the LED chips in adjacent chip clusters correspond to each other; an optical element, the optical element is arranged to cover a side of the base corresponding to the chip cluster. When in use, different LED chips within the chip clusters can work together to provide light compensation, increasing a total reflection area of the optical elements.

10 Claims, 8 Drawing Sheets

LED LIGHT-EMITTING STRUCTURE, LIGHT-EMITTING DEVICE, AND PREPARATION METHOD FOR LIGHT-EMITTING STRUCTURE

CROSS-REFERENCE TO RELATED APPLICATIONS

The present disclosure claims priority to Chinese Patent Application No. 202410690981.0, filed on May 30, 2024. The content of aforesaid application is incorporated herein by reference.

TECHNICAL FIELD

The present disclosure relates to the technical field of LED lights, and in particular to an LED light-emitting structure, a light-emitting device and a preparation method for the light-emitting structure.

BACKGROUND

LED is a semiconductor solid-state light-emitting device that adopts solid semiconductor chips as the light-emitting material. When voltage is applied to both terminals, the total minority carriers and majority carriers of the semiconductor recombine to release excess energy and emit photon, thereby emitting light directly. LED light sources have the advantages of high energy efficiency, long lifespan, and environmental friendliness.

With the continuous development of science and technology, LED has been widely adopted in various lighting devices. At the same time, as user demands evolve, LED products with higher luminous efficacy are being iterated. In the production and design of LED products, the principle of total internal reflection plays a crucial role in determining the luminous efficacy, where a larger reflection area leads to better long-distance light projection and more uniform light distribution.

In the prior art, LED lights typically adopt a design concept where individual LED chips are independently encapsulated within separate lamp beads. However, this design does not fully utilize the lens area, resulting in limitations in the luminous efficacy and long-distance performance of LED lights. Consequently, further optimization of lighting performance is challenging with the existing designs.

Therefore, the prior art still needs to be improved and developed.

SUMMARY

In order to solve the problem that LED lights in the prior art typically adopt the design concept where individual LED chips are independently encapsulated within separate lamp beads, while leads to low utilization rate of lamp bead lens, restricted luminous efficiency uniformity and long-range performance of the light, and the difficulty to optimize and improve the product performance of LED lights, the present disclosure provides an LED light-emitting structure, a light-emitting device and a preparation method for the light-emitting structure.

The present disclosure is achieved through the following technical solutions:

The present disclosure firstly provides an LED light-emitting structure, the LED light-emitting structure includes:

- a base, a conductive portion is arranged on one side of the base;
- a chip cluster, the chip cluster includes a plurality of LED chips, the plurality of LED chips include at least two types, the plurality of LED chips are fixedly arranged on another side of the base and connected to the conductive portion; a plurality of the chip clusters are arranged on the base, the plurality of the chip clusters are arranged in an array with a predetermined distance between each other, and positions of the LED chips in adjacent chip clusters correspond to each other;
- an optical element, the optical element is arranged to cover the side of the base corresponding to the chip cluster.

In the LED light-emitting structure, the plurality of LED chips in the chip cluster are arranged in an array;

- the LED chips include a first chip and a second chip;
- the first chip and the second chip in a same chip cluster are arranged in a staggered configuration; or
- the first chip and the second chip in a same chip cluster are arranged in a circular configuration.

In the LED light-emitting structure, an arrangement sequence of the plurality of LED chips in adjacent chip clusters on the base is reversed; or several groups of the chip clusters are arranged on the base, an arrangement sequence of LED chips in the chip clusters of a same group is identical, and an arrangement sequence of LED chips in the chip clusters of different groups is reversed; the chip clusters of different groups are arranged along predetermined relative positions.

In the LED light-emitting structure, the relative positions include:

- positions symmetrically arranged along a parallel line of a long side of a cross section of the base; and/or
- positions symmetrically arranged along a parallel line of a wide side of the cross section of the base; and/or
- positions symmetrically arranged along a parallel line of a diagonal line of the cross section of the base.

In the LED light-emitting structure, the base includes a plurality of regions, a plurality of the chip clusters are arranged in the plurality of regions, and the plurality of LED chips in the chip clusters in a single region are arranged in a predetermined sequence;

the chip clusters in different regions are symmetrically arranged.

The present disclosure secondly provides a light-emitting device, the light-emitting device includes any one of the LED light-emitting structures described above.

The present disclosure thirdly provides a preparation method for a light-emitting structure, the preparation method for the light-emitting structure includes the following steps:

- arranging a plurality of LED chips in an array with a predetermined distance to form a chip cluster, the chip cluster includes at least two types of LED chips;
- embedding a plurality of the chip clusters on one side of a base;
- arranging a conductive portion on another side of the base, and the conductive portion is electrically connected to the plurality of the chip clusters;
- arranging a plurality of optical elements on a side of the base corresponding to the plurality of the chip clusters, and the optical elements are arranged in one-to-one correspondence with the chip clusters.

In the preparation method for the light-emitting structure, the chip cluster includes at least two types of LED chips includes:

the chip cluster includes a plurality of first chips and a plurality of second chips, the first chip and the second chip in a same chip cluster are arranged in a staggered configuration; or the first chip and the second chip in a same chip cluster are arranged in a circular configuration.

In the preparation method for the light-emitting structure, the step of embedding a plurality of the chip clusters on one side of a base comprises:

arranging a plurality of LED chips in adjacent chip clusters on the base in a reversed sequence; or dividing the chip clusters on the base into several groups, arranging the plurality of LED chips in the chip clusters of a same group in an identical sequence, arranging the plurality of LED chips in the chip clusters of different groups in a reversed sequence, and arranging the chip clusters of different groups along predetermined relative positions;

the relative positions include:

positions symmetrically arranged along a parallel line of a long side of a cross section of the base; and/or positions symmetrically arranged along a parallel line of a wide side of the cross section of the base; and/or positions symmetrically arranged along a parallel line of a diagonal line of the cross section of the base.

In the preparation method for the light-emitting structure, the step of embedding a plurality of the chip clusters on one side of a base further includes:

dividing the base into a plurality of regions;

arranging the plurality of the chip clusters in a predetermined region, and arranging the plurality of LED chips in the chip clusters in the region in a predetermined sequence;

arranging the plurality of LED chips in the chip clusters in other regions symmetrically to the plurality of LED chips in the chip clusters in the predetermined region.

The beneficial effects of the present disclosure are as follows: in the present disclosure, chip clusters are arranged on the base, with each chip cluster including several different types of LED chips, while these chip clusters are covered with optical elements. During use, different LED chips within the chip clusters can work together to provide light compensation, increasing a total reflection area of the optical elements. This configuration enhances long-distance projection while improving the uniformity and stability of luminous efficacy, thereby optimizing the lighting performance of lights utilizing the LED light-emitting structure.

BRIEF DESCRIPTION OF THE DRAWINGS

In FIGS. 1 to 16:100, base; 110, conductive portion; 200, chip cluster; 210, LED chip; 211, first chip; 212, second chip; 300, optical element.

DETAILED DESCRIPTION OF EMBODIMENTS

In order to make the purpose, technical solution and effect of the present disclosure clearer and more specific, the present disclosure is further described in detail with reference to the accompanying drawings and embodiments. It should be understood that the embodiments described herein are only used to explain the present disclosure and are not used to limit the present disclosure.

It should be noted that if the embodiments of the present disclosure involve directional indications (such as up, down, left, right, front, back, etc.), the directional indications are only used to explain the relative position relationship, movement status, etc. between the components under a certain posture (as shown in the accompanying drawings). If the posture changes, the directional indications will also change accordingly.

In addition, if there are descriptions involving "first", "second", etc. in the embodiments of the present disclosure, the descriptions of "first", "second", etc. are only used for descriptive purposes and cannot be understood as indicating or suggesting the relative importance or implicitly indicating the number of the indicated technical features. Therefore, the features defined as "first" and "second" may explicitly or implicitly include at least one of the features. In addition, the technical solutions in various embodiments can be combined with each other, and the combination must be able to be implemented for those skilled in the art. When the combination of technical solutions is contradictory or cannot be implemented, it should be deemed that such a combination of technical solutions does not exist and is not within the scope of protection required by the present disclosure.

In the prior art, individual LED chips are independently encapsulated within separate lamp beads. However, this design does not fully utilize the lens area, resulting in limitations in the luminous efficacy and long-distance performance of LED lights. Consequently, further optimization of lighting performance is challenging with the existing designs.

Figure 1:
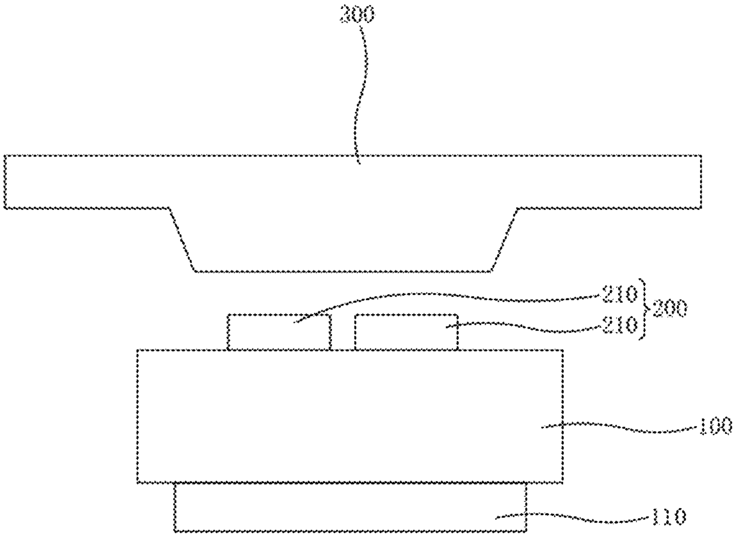
FIG. 1 is a schematic structural diagram of an LED light-emitting structure of the present disclosure.
Figure 2:
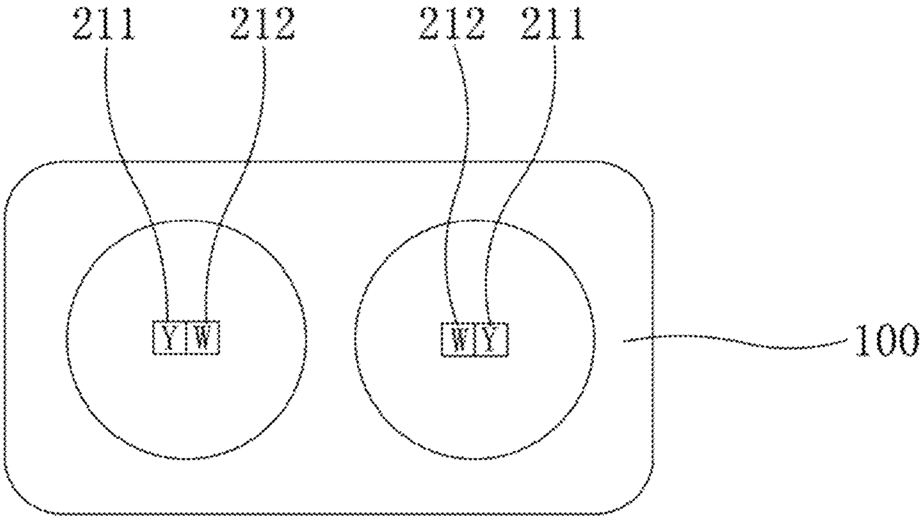
FIG. 2 is a schematic diagram of a first embodiment of the LED light-emitting structure of the present disclosure.

Based on the above problems in the prior art, the present disclosure provides an LED light-emitting structure, as shown in FIG. 1 and FIG. 2, the LED light-emitting structure includes: a base 100, a conductive portion 110 is arranged on one side of the base 100; a chip cluster 200, the chip cluster 200 includes a plurality of LED chips 210, the plurality of LED chips 210 include at least two types, the LED chips 210 are fixedly arranged on another side of the base 100, and are connected to the conductive portion 110; a plurality of the chip clusters 200 are arranged on the base 100, and the plurality of the chip clusters 200 are arranged in an array with a predetermined distance between each other, and the positions of the LED chips 210 in adjacent chip clusters 200 correspond to each other; an optical element 300, and the optical element 300 is arranged to cover the side of the base 100 corresponding to the chip cluster 200.

In the present disclosure, the chip clusters 200 are arranged on the base 100, while different types of LED chips 210 are included in each chip cluster 200, and the chip cluster 200 is covered by the optical element 300. When in use, different LED chips 210 in the chip cluster 200 can cooperate to form luminous compensation, thereby increasing the total reflection area of the optical element 300. Thus, a better long-range effect is provided while the uniformity and stability of the light effect are improved, and the lighting effect of lights using LED light-emitting structures is optimized.

In the above embodiments, as shown in FIG. 1 and FIG. 2, the main body of the LED light-emitting structure of the present disclosure is composed of a base 100, a chip cluster 200 and an optical element 300. The base 100 is a plate-shape structure for mounting the chip cluster 200, and can be made of ceramics, metals or other materials. A conductive portion 110 is provided on one side of the base 100, and the conductive portion 110 is made of a conductive metal material, which is used for electrical connection with the chip cluster 200, so as to provide power supply and circuit control for the chip cluster 200 when the LED light-emitting structure is installed in the device. In the present embodiment, the chip cluster 200 includes a plurality of LED chips 210. When the plurality of LED chips 210 are mounted on the base 100, the conductive portion 110 can be arranged to provide various configurations such as series connection, parallel connection and independent connection for the plurality of LED chips 210, so as to achieve a plurality of use effects such as simultaneous activation or individual control activation, and the specific connection form is prefabricated according to the actual use requirements and the model of the product, and the present disclosure does not limit this.

In the present embodiment, a plurality of the chip clusters 200 can be arranged on the base 100, and the plurality of the chip clusters 200 are arranged in an array with a predetermined distance between each other, and the positions of the LED chips 210 in adjacent chip clusters 200 correspond to each other. When in use, a plurality of chip clusters 200 cooperate with each other to form a luminous compensation effect. At the same time, since the LED chips 210 in the chip cluster 200 include multiple types, different luminous effects can be achieved through the cooperation of different light effects while forming the luminous compensation that cooperates with each other, thereby presenting a better luminous effect of the LED luminous structure as a whole.

The optical element 300 includes a lens commonly used in LED light-emitting structures. In the present embodiment, the optical element 300 is arranged to cover one side of the base 100 corresponding to the chip cluster 200 and is fixedly connected to the base 100. The optical element 300 is used to reflect light when a plurality of LED chips 210 emit light, so as to achieve the effect of guiding light at a predetermined angle, light-emitting surface, etc.

In the present embodiment, the chip cluster 200 includes a plurality of LED chips 210, and the plurality of LED chips 210 include at least two types. The color temperature, color, luminous intensity, etc. of the two types of LED chips 210 can be preset to be different. When the LED light-emitting structure is turned on, the two types of LED chips 210 can complement each other in light, thereby making full use of the reflection area of the optical element 300, thereby achieving the design goal of further optimizing the lighting effect.

Furthermore, taking the example of a chip cluster 200 containing two types of LED chips 210, that is, the LED chips 210 contained in the chip cluster 200 are a first chip 211 and a second chip 212, but the number is not limited. As shown in FIG. 2, the first chip 211 is replaced by a "Y" symbol, and the second chip 212 is replaced by a "W" symbol in the diagram to ensure that the description in conjunction with the drawings in the specification is clear and intuitive.

Figure 7:
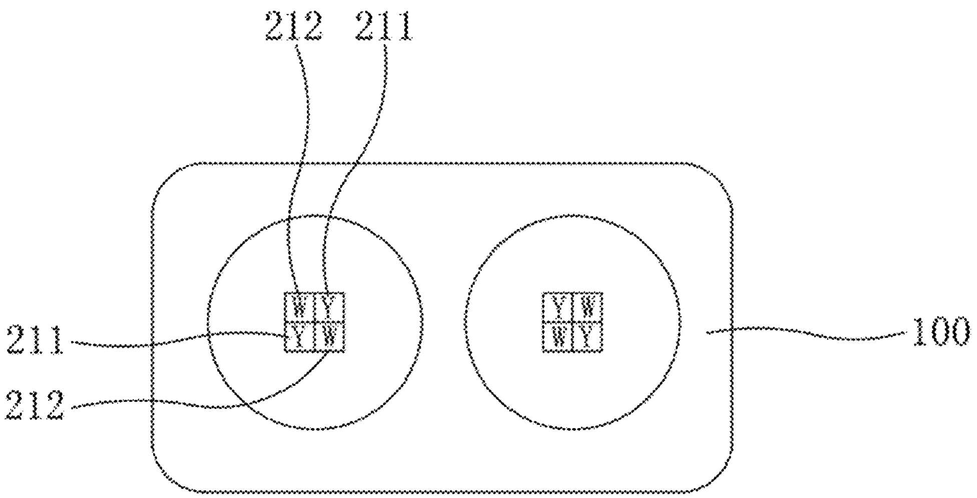
FIG. 7 is a schematic diagram of a sixth embodiment of the LED light-emitting structure of the present disclosure.

In the present embodiment, the plurality of LED chips 210 within the chip cluster 200 are arranged in an array. Specifically, the plurality of LED chips 210 within a chip cluster 200 also have a variety of arrangement types. For example, as shown in FIG. 2 and FIG. 7, the first chip 211 and the second chip 212 within the same chip cluster 200 are staggered, that is, a plurality of first chips 211 are staggered with each other, a plurality of second chips 212 are staggered with each other, and the first chip 211 and the second chip 212 are adjacent to each other, thereby forming an effect in which the light-emitting effects of different types of LED chips 210 complement each other.

For example, in the first embodiment of the LED light-emitting structure as shown in FIG. 2, a chip cluster 200 includes two LED chips 210, namely a first chip 211 and a second chip 212, and the first chip 211 and the second chip 212 are arranged side by side in a predetermined direction. In another example, in the sixth embodiment of the LED light-emitting structure as shown in FIG. 7, a chip cluster 200 includes four LED chips 210, namely two first chips 211 and two second chips 212, and the four LED chips 210 are arranged in a matrix style, and the same LED chips 210 are staggered.

Figure 16:
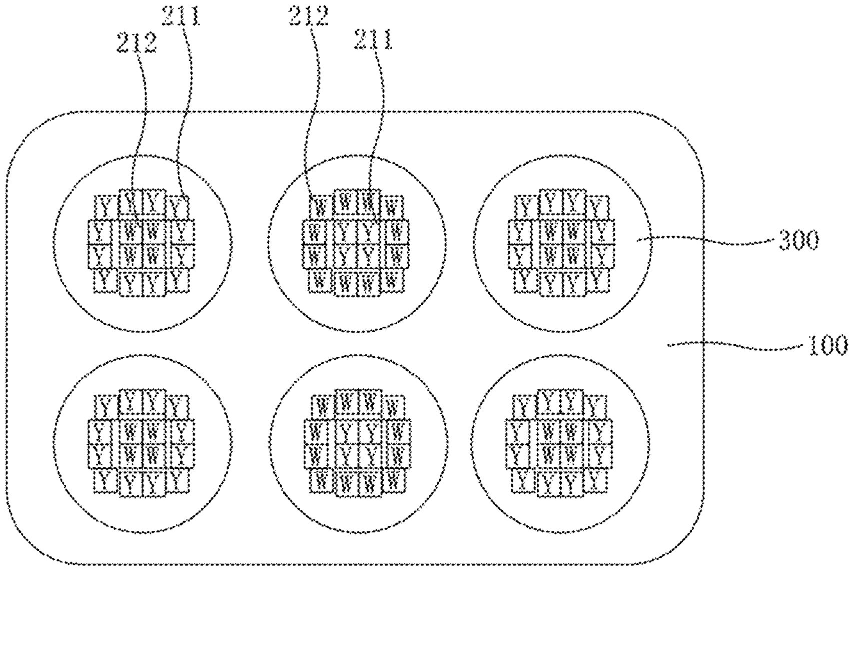
FIG. 16 is a schematic diagram of a fifteenth embodiment of the LED light-emitting structure of the present disclosure.

There is another arrangement form of the plurality of LED chips 210 in the above-mentioned chip cluster 200, that is, arranged in a circular array. For example, in the fifteenth embodiment of the LED light-emitting structure as shown in FIG. 16, a chip cluster 200 contains a plurality of first chips 211 and a plurality of second chips 212, and the number of one LED chip 210 is significantly greater than the number of another LED chip 210. Then, a circular array can be used to make one LED chip 210 surround another LED chip 210, so that the same fill light effect in principle can be achieved.

Furthermore, since the base 100 includes several chip clusters 200, adjacent chip clusters 200 need to achieve a complementary coordination effect. Therefore, the arrangement order of the LED chips 210 contained in different chip clusters 200 is different to form the local lighting effect coordination required by the product to provide a better long-range effect while improving the uniformity and stability of the lighting effect.

There are two ways to set up the chip cluster 200 on a base 100. One is that in adjacent chip clusters 200 on the base 100, the setting order of several LED chips 210 is opposite. For example, in the first embodiment of the LED light-emitting structure shown in FIG. 2, the setting order of the LED chips 210 in one chip cluster 200 is the first chip 211 and the second chip 212, and the setting order of the LED chips 210 in another chip cluster 200 is the second chip 212 and the first chip 211. When the two chip clusters 200 on the base 100 are lit at the same time, two adjacent second chips 212 are formed in the center to complement each other, and the two first chips 211 provide auxiliary light on both sides, which can achieve the effect of concentrating the lighting effect and making full use of the reflectivity of the optical element 300.

Figure 4:
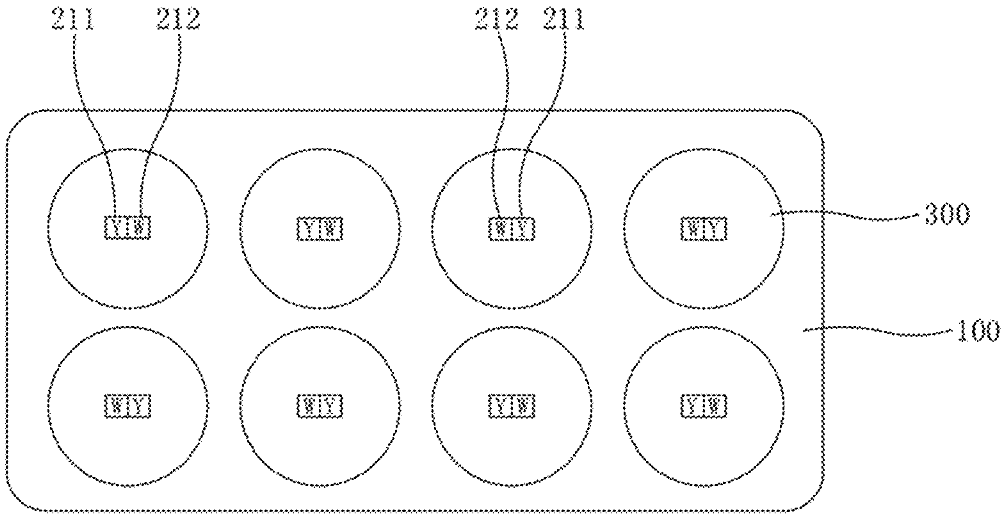
FIG. 4 is a schematic diagram of a third embodiment of the LED light-emitting structure of the present disclosure.

In another implementation, the plurality of the chip clusters 200 on the base 100 are divided into several groups, so that the arrangement order of the LED chips 210 in the chip clusters 200 in the same group is the same, and the arrangement order of the LED chips 210 in the chip clusters 200 in different groups is opposite, and the chip clusters 200 in different groups are arranged along predetermined relative positions. For example, in the third embodiment of the LED light-emitting structure as shown in FIG. 4, the plurality of chip clusters 200 on the base 100 are divided into four groups, namely, two chip clusters 200 in the upper left group, two chip clusters 200 in the upper right group, two chip clusters 200 in the lower left group, and two chip clusters 200 in the lower right group, wherein the LED chips 210 in the chip cluster 200 in the upper left group are arranged in the order of the first chip 211 and the second chip 212, the LED chips 210 in the chip clusters 200 in the upper right group and the lower left group adjacent to the group are arranged in the order of the second chip 212 and the first chip 211, and the LED chips 210 in the chip cluster 200 in the lower right group are arranged in the order of the first chip 211 and the second chip 212. In the chip clusters 200 divided into groups, the effects of intra-group luminescence compensation and inter-group luminescence compensation can be formed, thereby further improving the reflectivity effect of the optical element 300.

Figure 6:
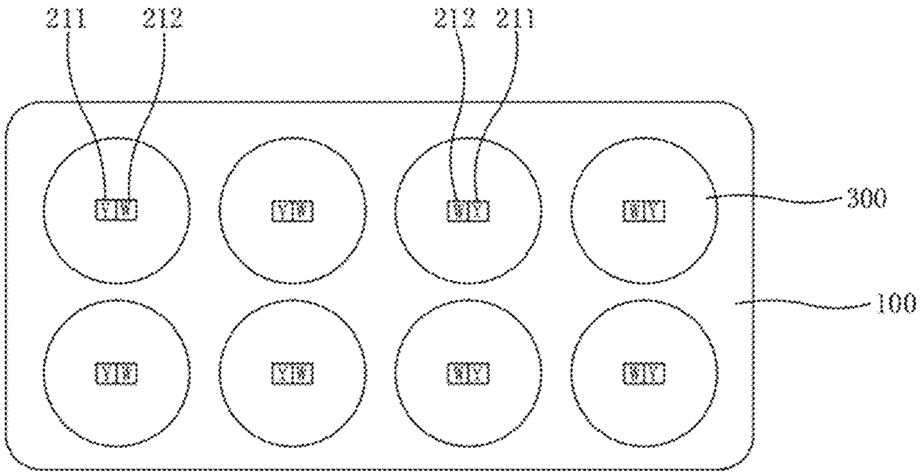
FIG. 6 is a schematic diagram of a fifth embodiment of the LED light-emitting structure of the present disclosure.

Based on the above embodiments, in one implementation of the present disclosure, the chip clusters 200 of different groups are arranged along predetermined relative positions, and the relative positions are defined as follows:

First, the positions are arranged symmetrically along the parallel line of the long side of the cross section of the base 100;

Second, the positions are arranged symmetrically along the parallel line of the wide side of the cross section of the base 100;

As shown in FIG. 6, the fifth embodiment of the LED light-emitting structure, is taken as an example. In FIG. 6, there are four groups of chip clusters 200 included, namely, two chip clusters 200 in the upper left, two chip clusters 200 in the upper right, two chip clusters 200 in the lower left, and two chip clusters 200 in the lower right. The arrangement order of the LED chips 210 in each group is the same, the upper left group and the upper right group are symmetrically arranged with the lower left group and the lower right group along the parallel line direction of the long side of the cross section of the base 100.

It can also be considered that the four left chip clusters 200 are one group and the four right chip clusters 200 are one group, and the arrangement order of the LED chips 210 in each group is the same, wherein the left group is symmetrically arranged with the right group along the parallel line direction of the wide side of the cross section of the base 100.

Figure 9:
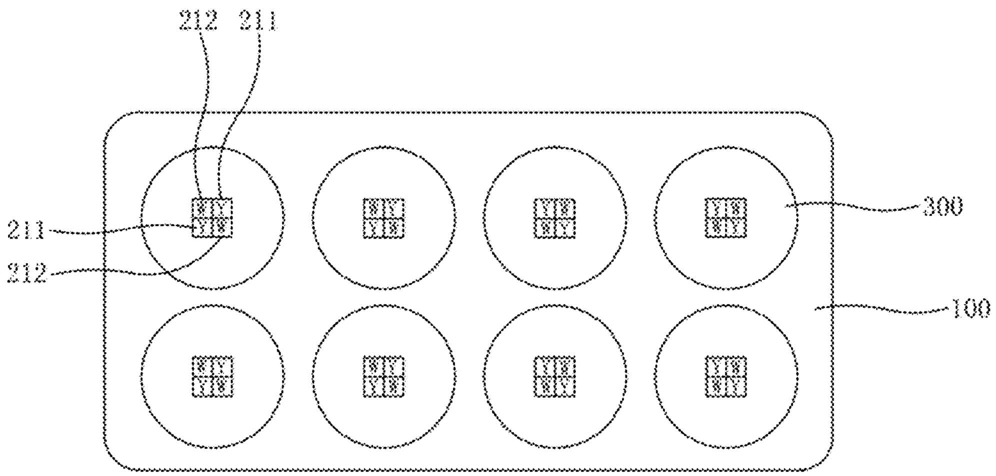
FIG. 9 is a schematic diagram of an eighth embodiment of the LED light-emitting structure of the present disclosure.

Third, the positions are symmetrically arranged along the parallel line of the diagonal line of the cross section of the base 100;

As shown in FIG. 9, taking the eighth embodiment of the LED light-emitting structure as an example, among the four chip clusters 200 on the left side of FIG. 9, the upper left chip cluster 200 and the lower right chip cluster 200 are symmetrically arranged along the parallel lines of the diagonal lines of the cross section of the base 100; the upper right chip cluster 200 and the lower left chip cluster 200 are symmetrically arranged along the parallel lines of the diagonal lines of the cross section of the base 100.

In another embodiment of the present disclosure, the base 100 can be divided into regions, so that a plurality of the chip clusters 200 are arranged in the region, and the plurality of LED chips 210 in the chip cluster 200 in a single region are arranged in a predetermined order; the chip clusters 200 in different regions are arranged to correspond to each other.

As shown in FIG. 4, taking the third embodiment of the LED light-emitting structure as an example, in FIG. 4, the base 100 is divided into four areas, namely, upper left, upper right, lower left and lower right, and two chip clusters 200 are arranged in each area, and the LED chips 210 in the two chip clusters 200 are arranged in the same order. Under regional comparison, the chip clusters 200 in the upper left and lower left areas are symmetrically arranged with the chip clusters 200 in the upper right and lower right areas, that is, a light effect complementation effect tending to the center of symmetry is formed, thereby improving the light transmittance of the optical element 300 and the overall light-emitting effect of the LED light-emitting structure.

Based on the above embodiments, the present disclosure provides sixteen embodiments based on the above LED light-emitting structure setting principle, as follows:

First Embodiment

As shown in FIG. 2, in the present embodiment, two chip clusters 200 are arranged on the base 100, corresponding to two optical elements 300, and two LED chips 210 are arranged in one chip cluster 200, wherein the arrangement order of the LED chips 210 in the chip cluster 200 on the left is the first chip 211 and the second chip 212, and the arrangement order of the LED chips 210 in the chip cluster 200 on the right is the second chip 212 and the first chip 211, and the chip clusters 200 on the left and right sides are symmetrically arranged along the parallel line direction of the wide side of the cross section of the base 100, so that the light effects of the two middle LED chips 210 can complement each other, and the two LED chips 210 on the two sides can provide auxiliary light.

Second Embodiment

Figure 3:
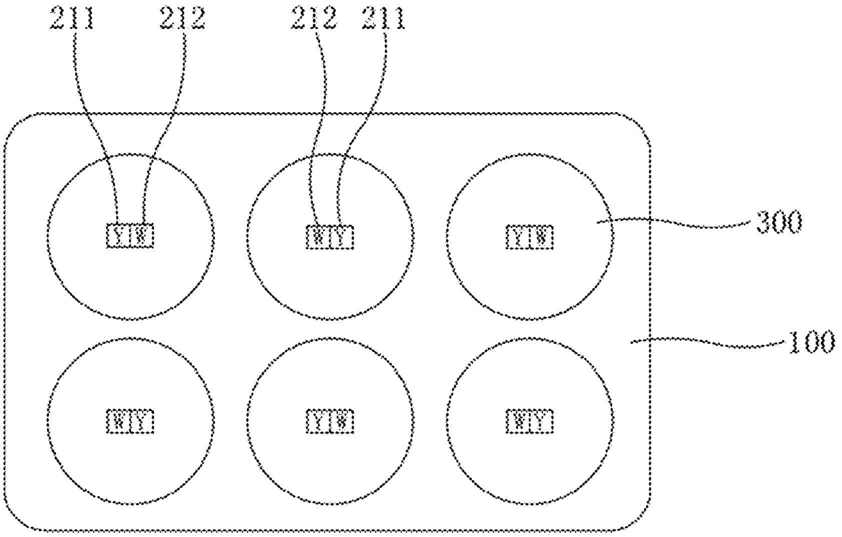
FIG. 3 is a schematic diagram of a second embodiment of the LED light-emitting structure of the present disclosure.

As shown in FIG. 3, in the present embodiment, six chip clusters 200 are arranged on the base 100, each chip cluster 200 includes two LED chips 210, and in adjacent chip clusters 200 on the base 100, the arrangement order of several LED chips 210 is opposite, that is, several LED chips 210 are distributed in the horizontal direction of the base 100 as shown in the figure, and the adjacent LED chips 210 between different chip clusters 200 are of the same type and can complement each other, and the LED chips 210 are distributed in the vertical direction as shown in the figure, and the adjacent LED chips 210 between different chip clusters 200 are of different types, which can provide radiant light to make the light effect softer.

Third Embodiment

As shown in FIG. 4, in the present embodiment, eight chip clusters 200 are arranged on the base 100, of which the two on the upper left form a group, the two on the upper right form a group, the two on the lower left form a group, and the two on the lower right form a group. The upper left and lower left groups are symmetrically arranged relative to the upper right and lower right groups along the parallel lines of the long sides of the cross section of the base 100, and the upper left and lower left groups are symmetrically arranged relative to the upper right and lower right groups along the parallel lines of the wide sides of the cross section of the base 100. In addition, the eight chip clusters 200 are also complementary along the diagonal line, so that the light effects of the left group and the right group complement and concentrate each other, and the light effects of the upper group and the lower group assist in making the light effect softer.

Fourth Embodiment

Figure 5:
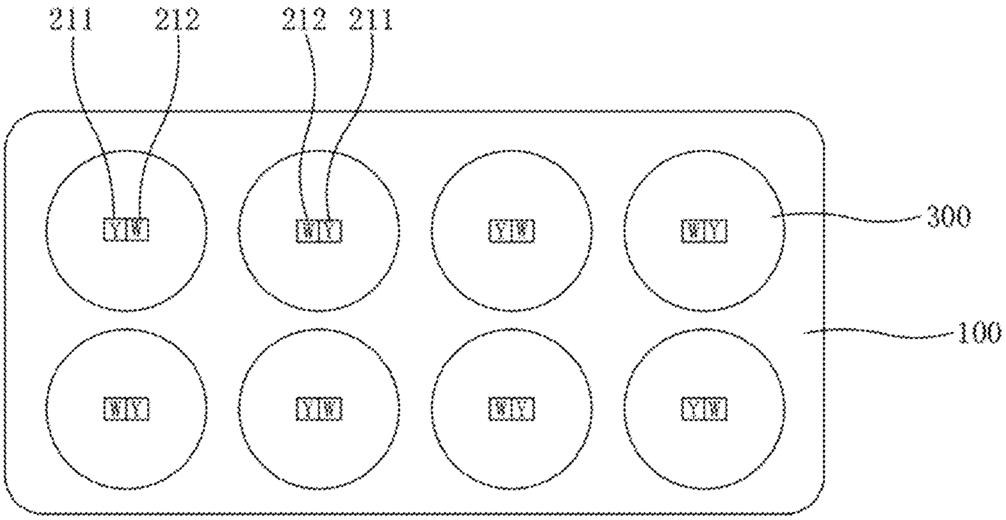
FIG. 5 is a schematic diagram of a fourth embodiment of the LED light-emitting structure of the present disclosure.

As shown in FIG. 5, in the present embodiment, eight chip clusters 200 are arranged on the base 100, wherein the arrangement order of the LED chips 210 in adjacent chip clusters 200 are opposite, so that the light effects in the horizontal direction as shown in the figure can complement each other and the light effects in the vertical direction as shown in the figure can be auxiliary and uniform and soft.

Fifth Embodiment

As shown in FIG. 6, in the present embodiment, eight chip clusters 200 are arranged on the base 100, which are divided into groups on the left and right sides of the base 100. The arrangement order of the LED chips 210 in the four chip clusters 200 on the left is the same, and the arrangement order of the LED chips 210 in the four chip clusters 200 on the right is the same, and the left and right groups are symmetrically arranged along the parallel lines of the wide side of the cross section of the base 100, so that the lighting effects of the left group and the right group can complement each other in the horizontal and vertical center line directions of the substrate, and the LED chips 210 in the group can assist each other in filling in the light.

Sixth Embodiment

As shown in FIG. 7, in the present embodiment, two chip clusters 200 are arranged on the base 100, each chip cluster 200 includes four LED chips 210 arranged in a rectangular array, the chip cluster 200 on the left is arranged in a staggered arrangement of a second chip 212, a first chip 211, a first chip 211, and a second chip 212, the chip cluster 200 on the right and the chip cluster 200 on the left are symmetrically arranged along the parallel lines of the wide side of the cross section of the base 100, so that the LED chips 210 in the chip cluster 200 can assist each other in filling in light, soften the light and improve the transmittance of the optical element 300, and the chip clusters 200 assist each other in filling in light, so that the light effect is concentrated in the center.

Seventh Embodiment

Figure 8:
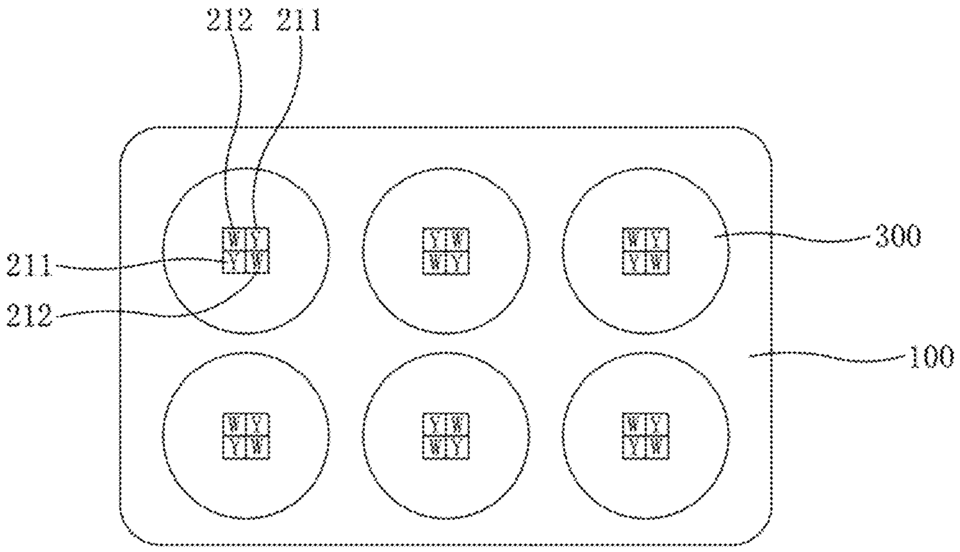
FIG. 8 is a schematic diagram of a seventh embodiment of the LED light-emitting structure of the present disclosure.

As shown in FIG. 8, in the present embodiment, six chip clusters 200 are arranged on the base 100, each chip cluster 200 includes four LED chips 210 arranged in a rectangular array, and in the horizontal direction, the arrangement order of the LED chips 210 of adjacent chip clusters 200 is opposite, which can form an effect of mutual auxiliary light filling within the chip cluster 200, soften the light and improve the transmittance of the optical element 300, and in the vertical direction, the chip cluster 200 on the upper side and the chip cluster 200 on the lower side are symmetrically arranged along the parallel line direction of the long side of the cross section of the base 100, thereby forming an effect of mutual light filling between adjacent chip clusters 200 in this direction.

Eighth Embodiment

As shown in FIG. 9, in the present embodiment, eight chip clusters 200 are arranged on the base 100, each chip cluster 200 includes four LED chips 210 arranged in a rectangular array, wherein the upper left two chip clusters 200 form a group, the upper right two chip clusters 200 form a group, the lower left two chip clusters 200 form a group, and the lower right two chip clusters 200 form a cluster. The LED chips 210 of the chip clusters 200 within a group are arranged in the same order, and the LED chips 210 in the chip clusters 200 of groups on the left and groups on the right are arranged in the opposite order, so that the LED chips 210 in the chip clusters 200 can assist each other in filling in light, soften the light and improve the transmittance of the optical element 300, and the groups can assist each other in filling in light, making the light effect softer.

Ninth Embodiment

Figure 10:
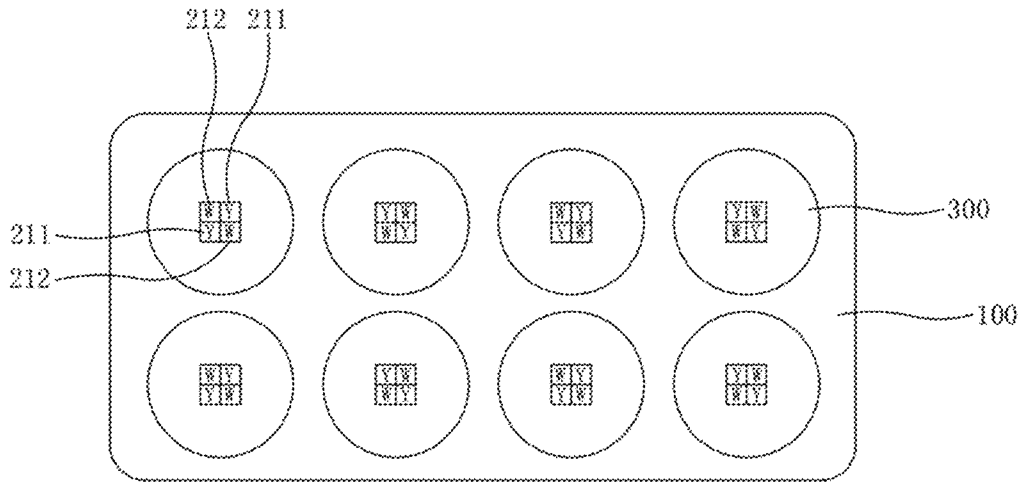
FIG. 10 is a schematic diagram of a ninth embodiment of the LED light-emitting structure of the present disclosure.

As shown in FIG. 10, in the present embodiment, eight chip clusters 200 are arranged on the base 100, each chip cluster 200 includes four LED chips 210 arranged in a rectangular array, wherein the two chip clusters 200 in the first vertical column on the left are a group, the two chip clusters 200 in the second vertical column on the left are a group, the two chip clusters 200 in the second vertical column on the right are a group, and the two chip clusters 200 in the first column on the right are a group. The arrangement order of the LED chips 210 in the chip clusters 200 of different groups is opposite, which can form auxiliary fill light within the chip cluster 200 within the group, making the light effect softer, and the groups fill light each other to achieve the effect of concentrated light effect.

Tenth Embodiment

Figure 11:
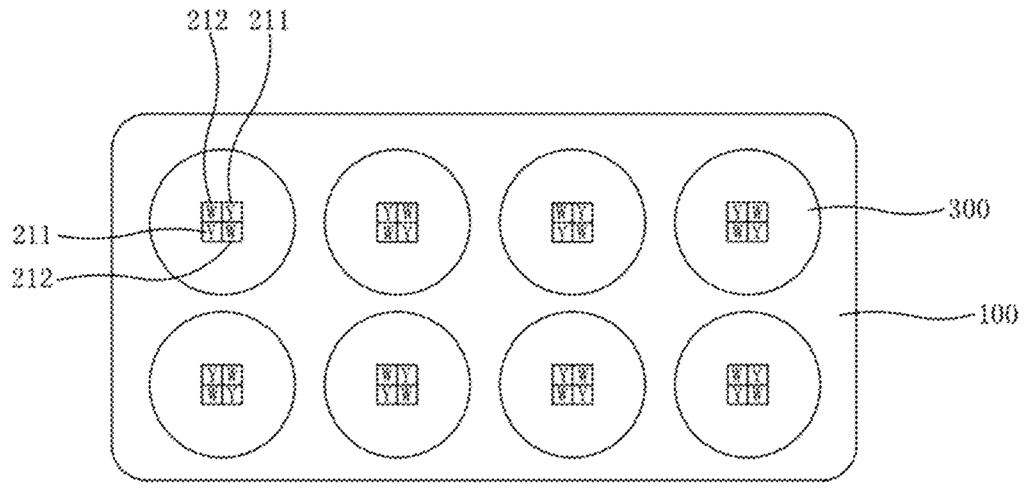
FIG. 11 is a schematic diagram of a tenth embodiment of the LED light-emitting structure of the present disclosure.

As shown in FIG. 11, in the present embodiment, eight chip clusters 200 are arranged on the base 100, each chip cluster 200 includes four LED chips 210 arranged in a rectangular array, wherein the first chip 211 and the second chip 212 in the same chip cluster 200 are alternately arranged, and the arrangement order of several LED chips 210 in adjacent chip clusters 200 is opposite, so that different LED chips 210 in the chip cluster 200 can complement each other, thereby improving the light transmittance of the optical element 300, and adjacent LED chips 210 between different clusters complement each other, thereby achieving the effect of concentrating the light effect.

Eleventh Embodiment

Figure 12:
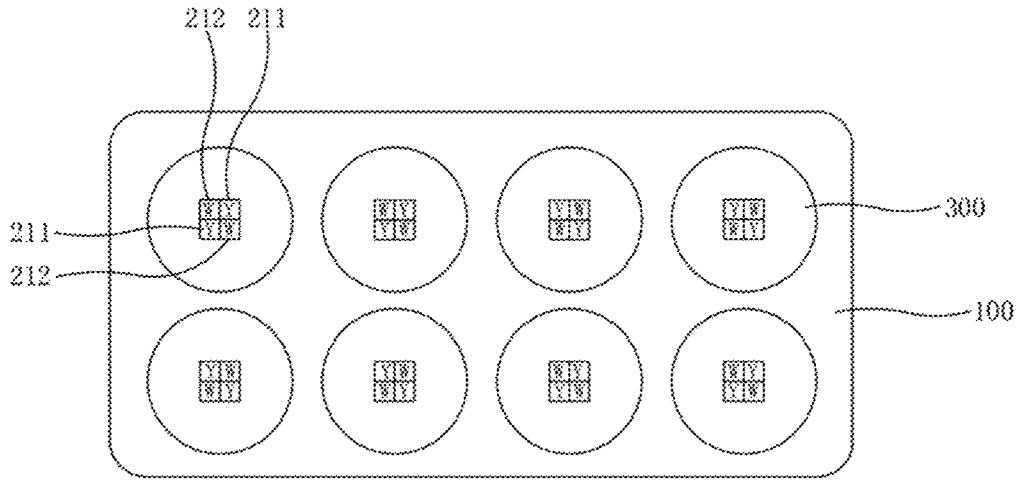
FIG. 12 is a schematic diagram of an eleventh embodiment of the LED light-emitting structure of the present disclosure.

As shown in FIG. 12, in the present embodiment, eight chip clusters 200 are arranged on the base 100, each chip cluster 200 includes four LED chips 210 arranged in a rectangular array, wherein the upper left two chip clusters 200 form a group, the upper right two chip clusters 200 form a group, the lower left two chip clusters 200 form a group, and the lower right two chip clusters 200 form a cluster. The LED chips 210 of the chip clusters 200 within a group are arranged in the same order, and the LED chips 210 in the chip clusters 200 of adjacent groups are arranged in the opposite order, so that the LED chips 210 in the chip clusters 200 can assist each other in filling in light, soften the light and improve the transmittance of the optical element 300, and the groups can assist each other in filling in light, making the light effect softer.

Twelfth Embodiment

Figure 13:
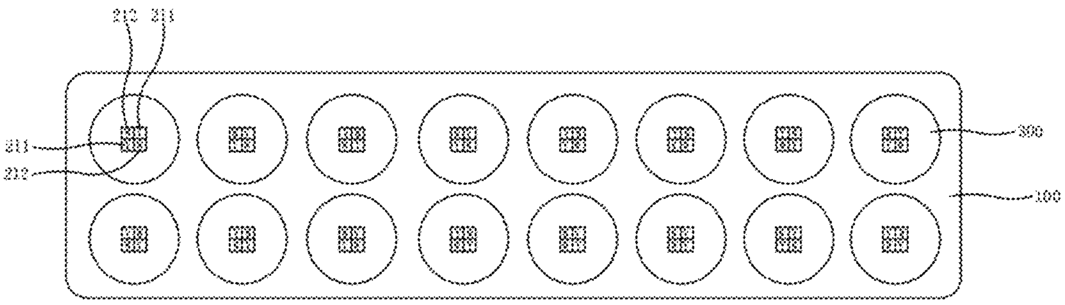
FIG. 13 is a schematic diagram of a twelfth embodiment of the LED light-emitting structure of the present disclosure.

As shown in FIG. 13, in the present embodiment, sixteen chip clusters 200 are arranged on the base 100, and each chip cluster 200 includes four LED chips 210 arranged in a rectangular array. From a left-right perspective, the chip cluster 200 in the left area is symmetrically arranged with the chip cluster 200 in the right area, and from a top-bottom perspective, the chip cluster 200 in the upper area is symmetrically arranged with the chip cluster 200 in the lower area. At the same time, the present embodiment also includes a chip cluster 200 arrangement that is symmetrical along the diagonal direction, so that the LED chips 210 in the chip cluster 200 can assist each other in filling in light, soften the light and increase the transmittance of the optical element 300, and the areas can assist each other in filling in light, making the light effect softer.

Thirteenth Embodiment

Figure 14:
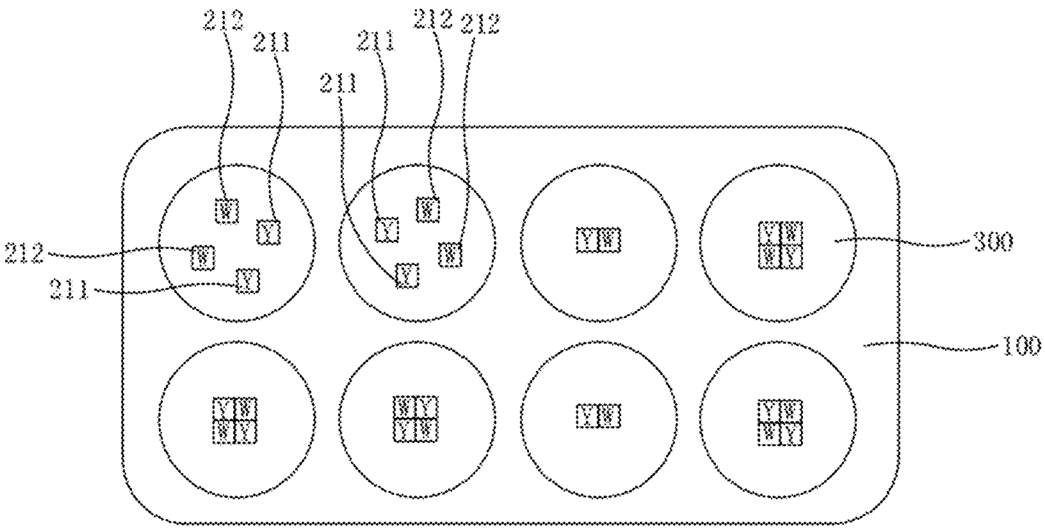
FIG. 14 is a schematic diagram of a thirteenth embodiment of the LED light-emitting structure of the present disclosure.

As shown in FIG. 14, in the present embodiment, eight chip clusters 200 are arranged on the base 100. Different from the above-mentioned embodiment, the present embodiment includes both a chip cluster 200 having two LED chips 210 and a chip cluster 200 having four LED chips 210. In addition, the arrangement of the LED chips 210 in a single chip cluster 200 follows an array arrangement, but is not limited to a rectangular array. In the present embodiment, taking the two chip clusters 200 on the upper left as an example, the two are symmetrically arranged along the parallel lines of the wide sides of the cross section of the base 100; taking the two chip clusters 200 on the lower left as an example, the two are symmetrically arranged along the parallel lines of the wide sides of the cross section of the base 100; taking the two vertical chip clusters 200 on the right side near the center as an example, the two are symmetrically arranged along the parallel lines of the long sides of the cross section of the base 100; taking the two vertical chip clusters 200 on the right side near the edge of the base 100 as an example, the two are arranged in the same order along the parallel lines of the long sides of the cross section of the base 100.

In the present embodiment, the chip clusters 200 in different areas are symmetrically arranged, but the division of the areas is not limited to specific rules. This arrangement is applied to light-emitting devices with different lighting effects, that is, the above-mentioned eight chip clusters 200 are not necessarily turned on at the same time, but can be turned on independently along the area to achieve the effect of mutual light supplement for the chip clusters 200 in the area.

Fourteenth Embodiment

Figure 15:
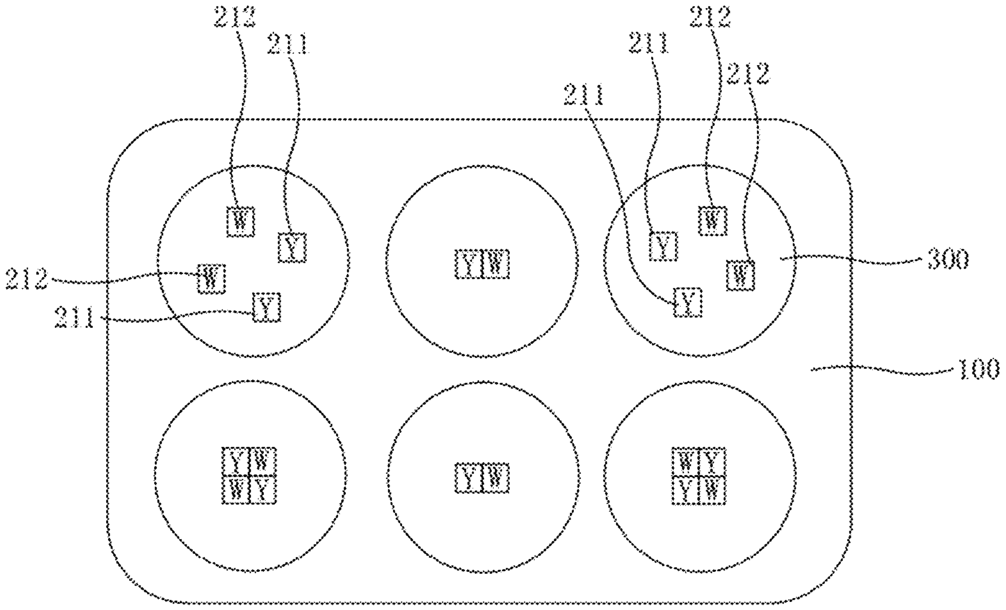
FIG. 15 is a schematic diagram of a fourteenth embodiment of the LED light-emitting structure of the present disclosure.

As shown in FIG. 15, in the present embodiment, six chip clusters 200 are arranged on the base 100. The present embodiment includes both a chip cluster 200 having two LED chips 210 and a chip cluster 200 having four LED chips 210. In addition, the arrangement of the LED chips 210 in a single chip cluster 200 follows an array arrangement, but is not limited to a rectangular array. Different from the above-mentioned embodiment, in the present embodiment, the upper left chip cluster 200 and the upper right chip cluster 200 are symmetrically arranged along the parallel lines of the wide sides of the cross section of the base 100; the lower left chip cluster 200 and the lower right chip cluster 200 are symmetrically arranged along the parallel lines of the wide sides of the cross section of the base 100; and the two middle chip clusters 200 are symmetrically arranged along the parallel lines of the long sides of the cross section of the base 100.

In the present embodiment, the chip clusters 200 in different areas are symmetrically arranged, but the division of the areas is not limited to specific rules. This arrangement is applied to light-emitting devices with different lighting effects, that is, the above-mentioned six chip clusters 200 are not necessarily turned on at the same time, but can be turned on independently along the area to achieve the effect of mutual light supplement for the chip clusters 200 in the area.

Fifteenth Embodiment

As shown in FIG. 16, in the present embodiment, six chip clusters 200 are arranged on the base 100, and the first chip 211 and the second chip 212 in each chip cluster 200 are arranged in a circular array, which can form an effect of the outer circular LED chip 210 wrapping the inner circular LED chip 210 to fill in the light, so as to make full use of the light transmittance of the optical element 300. In addition, in the horizontal direction, the arrangement order of the LED chips 210 in adjacent chip clusters 200 is opposite, so as to achieve the effect of auxiliary fill in the adjacent chip clusters 200 and make the light effect softer. In the vertical direction, the chip clusters 200 in the upper row and the chip clusters 200 in the lower row are symmetrically arranged along the parallel lines of the long side direction of the cross section of the base 100, so as to achieve the effect of making the adjacent chip clusters 200 fill in the light to concentrate the light effect.

Based on above embodiments, in the present disclosure, the chip clusters 200 are arranged on the base 100, with each chip cluster 200 including several different types of LED chips 210, while these chip clusters 200 are covered with optical element 300. During use, different LED chips 210 within the chip clusters 200 can work together to provide light compensation, increasing a total reflection area of the optical element 300. In addition, there are coordinated settings and auxiliary fill light between the plurality of the chip clusters 200, which enhance long-distance projection while improving the uniformity and stability of luminous efficacy, thereby optimizing the lighting performance of lights utilizing the LED light-emitting structure.

Based on the above embodiments, the present disclosure also provides a light-emitting device, which includes the LED light-emitting structure described in any one of the above embodiments, and the LED light-emitting structure includes: a base, a conductive portion is arranged on one side of the base; a chip cluster, the chip cluster includes a plurality of LED chips, the plurality of LED chips include at least two types, the LED chips are fixedly arranged on another side of the base, and are connected to the conductive portion; there are a plurality of chip clusters on the base, and the plurality of chip clusters are arranged in an array with a predetermined distance between them, and the positions of the LED chips in adjacent chip clusters correspond; an optical element, and the optical element is arranged to cover on one side of the base corresponding to the chip cluster. The present disclosure arranges a chip cluster on the base, the chip cluster includes a plurality of different types of LED chips, and covers the chip cluster with an optical element. When in use, different LED chips in the chip cluster can cooperate to form light compensation, increase the total reflection area of the optical element, and can provide a better long-range effect while improving the uniformity and stability of the light effect, thereby optimizing the lighting effect of the light using the LED light-emitting structure.

The present disclosure also provides a preparation method for a light-emitting structure, which comprises the following steps:

S1, arranging a plurality of LED chips in an array with a predetermined distance to form a chip cluster, the chip cluster includes at least two types of LED chips;

S2, embedding a plurality of the chip clusters on one side of a base;

S3, arranging a conductive portion on another side of the base, and the conductive portion is electrically connected to the plurality of the chip clusters;

S4. arranging a plurality of optical elements on a side of the base corresponding to the plurality of the chip clusters, and the optical elements are arranged in one-to-one correspondence with the chip clusters.

In the present disclosure, a plurality of LED chips are arranged in an array with a predetermined distance, and at least two types of LED chips are included to form a chip cluster. The chip cluster is mounted on a base and electrically connected to a conductive portion on the other side of the base, and an optical element corresponding to the chip cluster is arranged on one side of the base corresponding to the chip cluster. Due to the mutual light compensation between different types of LED chips in the chip cluster, the light transmittance of the optical element can be improved, thereby increasing the irradiation distance of the light-emitting structure. At the same time, the mutual light compensation between different types of LED chips can also effectively improve the uniformity of the light effect, thereby improving the light effect of the light-emitting device using the LED light-emitting mechanism.

The above chip cluster contains at least two types of LED chips:

S11, the chip cluster includes a plurality of first chips and a plurality of second chips, the first chip and the second chip in a same chip cluster are arranged in a staggered configuration; or the first chip and the second chip in a same chip cluster are arranged in a circular configuration.

The arrangement of the two types of LED chips in the chip cluster of the present disclosure can be specifically divided into two types, one is a staggered arrangement of the first chip and the second chip, which is suitable for a plurality of LED chips arranged in a rectangular array;

Another one is that the first chip and the second chip are arranged in a circular shape. The above two LED chip arrangements can achieve different lighting effects. What is the same is that both arrangements adopt the principle of different types of LED chips complementing each other, so both can achieve the effect of improving the light transmittance of optical elements and the uniformity of light effect.

The above-mentioned embedding a plurality of the chip clusters on one side of the base includes:

S21, arranging a plurality of LED chips in adjacent chip clusters on the base in a reversed sequence; or dividing the chip clusters on the base into several groups, arranging the plurality of LED chips in the chip clusters of a same group in an identical sequence, arranging the plurality of LED chips in the chip clusters of different groups in a reversed sequence, and arranging the chip clusters of different groups along predetermined relative positions;

the relative positions include:

positions symmetrically arranged along a parallel line of a long side of a cross section of the base; and/or positions symmetrically arranged along a parallel line of a wide side of the cross section of the base; and/or positions symmetrically arranged along a parallel line of a diagonal line of the cross section of the base.

In the present disclosure, the arrangement sequence of the plurality of LED chips in adjacent chip clusters on the base is reversed, that is, the adjacent LED chips in adjacent chip clusters are formed in the same configuration but different sequence, so that adjacent LED chips in different chip clusters can complement each other to achieve the effect of concentrated light effect; in some specific embodiments, the above arrangement is not limited to the relative arrangement of a single chip cluster, and several chip clusters can be divided into groups, so that the order of several LED chips in the chip clusters in the same group is set to the same, and the order of LED chips in different chip clusters is set to different, so as to achieve a specific light effect supplement effect. Among them, the chip clusters of different groups need to be arranged according to a predetermined relative position, and the relative position includes symmetrical arrangement along the parallel lines of the long side of the cross section of the base; and, or symmetrical arrangement along the parallel lines of the wide side of the cross section of the base; and, or symmetrical arrangement along the parallel lines of the diagonal lines of the cross section of the base, so as to achieve the effect of light effect supplement at different angles and different positions, and improve the luminous quality.

The above-mentioned embedding a plurality of chip clusters on one side of the base also includes:

S221, dividing the base into a plurality of regions;

S222, arranging the plurality of the chip clusters in a predetermined region, and arranging the plurality of LED chips in the chip clusters in the region in a predetermined sequence;

S223, arranging the plurality of LED chips in the chip clusters in other regions symmetrically to the plurality of LED chips in the chip clusters in the predetermined region.

The arrangement of the chip clusters in the present disclosure also includes dividing the chip clusters based on the regions on the base, arranging the LED chips in the chip cluster in a predetermined order in the predetermined region, and arranging the chip clusters in other regions symmetrically according to the LED chips in the chip cluster in the predetermined area. The chip clusters are arranged symmetrically by region, so that the chip clusters in the region complement each other. This configuration is suitable for the application of a light-emitting device having multiple light-emitting modes.

It should be understood that the application of the present disclosure is not limited to the above examples. For ordinary technicians in this field, improvements or changes can be made based on the above description. All these improvements and changes should fall within the scope of protection of the claims attached to the present disclosure.

What is claimed is:

1. An LED light-emitting structure, comprising:

a base, and a conductive portion that is arranged on one side of the base;

a chip cluster, the chip cluster comprises a plurality of LED chips, the plurality of LED chips comprise at least two types, the plurality of LED chips are fixedly arranged on another side of the base and connected to the conductive portion; a plurality of the chip clusters are arranged on the base, the plurality of the chip clusters are arranged in an array with a predetermined distance between each other, and positions of the LED chips in adjacent chip clusters correspond to each other; and an optical element that is arranged to cover a side of the base corresponding to the chip cluster;

wherein the plurality of LED chips in the chip cluster are arranged in an array;

wherein the LED chips comprise a first chip and a second chip;

wherein the first chip and the second chip in a same chip cluster are arranged in an interleaved arrangement with positions offset in row and/or column within a rectangular array such that chips of different types are adjacent; and wherein each chip cluster defines a rectangular array having a common row-and-column orientation relative to the base, such that for any given row and column position in one chip cluster, a chip is present at the same row and column position in each immediately adjacent chip cluster; and the rectangular arrays of the plurality of chip clusters share the same row-and-column orientation relative to the base.

2. The light-emitting structure according to claim 1, wherein the first chip and the second chip in another chip cluster are arranged in an interleaved arrangement with positions offset in row and/or column within a rectangular array or in a circular configuration; and wherein, between two adjacent chip clusters, the arrangement is reversed by assigning opposite chip types at corresponding row-and-column positions while maintaining positional correspondence across the two adjacent chip clusters.

3. The light-emitting structure according to claim 2, wherein an arrangement sequence of the plurality of LED chips in adjacent chip clusters on the base is reversed; or several groups of the chip clusters are arranged on the base, an arrangement sequence of LED chips in the chip clusters of a same group is identical, and an arrangement sequence of LED chips in the chip clusters of different groups is reversed; the chip clusters of different groups are arranged along predetermined relative positions;

wherein the reversal preserves the row-and-column positions within each rectangular array and differs only in chip-type assignment at those positions.

4. The light-emitting structure according to claim 3, wherein the relative positions comprise:

positions symmetrically arranged along a parallel line of a long side of a cross section of the base; and/or positions symmetrically arranged along a parallel line of a wide side of the cross section of the base; and/or positions symmetrically arranged along a parallel line of a diagonal line of the cross section of the base.

5. The light-emitting structure according to claim 2, wherein the base comprises a plurality of regions, a plurality of the chip clusters are arranged in the plurality of regions, and the plurality of LED chips in the chip clusters in a single region are arranged in a predetermined sequence; and the chip clusters in different regions are symmetrically arranged, wherein the rectangular arrays in the plurality of regions share the same row-and-column orientation relative to the base.

6. A light-emitting device, wherein the light-emitting device comprises the light-emitting structure according to claim 1.

7. A preparation method for a light-emitting structure, the method comprising:

arranging a plurality of LED chips in an array with a predetermined distance to form a chip cluster, the chip cluster comprises at least two types of LED chips;

embedding a plurality of the chip clusters on one side of a base;

arranging a conductive portion on another side of the base, and the conductive portion is electrically connected to the plurality of the chip clusters; and arranging a plurality of optical elements on a side of the base corresponding to the plurality of the chip clusters, and the optical elements are arranged in one-to-one correspondence with the chip clusters;

wherein the chip cluster comprises at least two types of LED chips;

wherein the chip cluster comprises a plurality of first chips and a plurality of second chips; and wherein the plurality of first chips and the plurality of second chips in a same chip cluster are arranged in an interleaved arrangement with positions offset in row and/or column within a rectangular array such that chips of different types are adjacent;

the method further comprising orienting the rectangular arrays of the plurality of chip clusters to a common row-and-column orientation relative to the base.

8. The method according to claim 7, wherein the plurality of first chips and the plurality of second chips in another chip cluster are arranged in an interleaved arrangement with positions offset in row and/or column within a rectangular array or in a circular configuration, and wherein reversing the arrangement sequence between two adjacent chip clusters comprises assigning opposite chip types at corresponding row-and-column positions while maintaining positional correspondence across the two adjacent chip clusters.

9. The method according to claim 7, wherein embedding a plurality of the chip clusters on one side of a base comprises:

arranging a plurality of LED chips in adjacent chip clusters on the base in a reversed sequence; or dividing the chip clusters on the base into several groups, arranging the plurality of LED chips in the chip clusters of a same group in an identical sequence, arranging the plurality of LED chips in the chip clusters of different groups in a reversed sequence, and arranging the chip clusters of different groups along predetermined relative positions;

the relative positions comprise:

positions symmetrically arranged along a parallel line of a long side of a cross section of the base; and/or positions symmetrically arranged along a parallel line of a wide side of the cross section of the base; and/or positions symmetrically arranged along a parallel line of a diagonal line of the cross section of the base.

10. The method according to claim 7, wherein embedding a plurality of the chip clusters on one side of a base further comprises:

dividing the base into a plurality of regions;

arranging the plurality of the chip clusters in a predetermined region, and arranging the plurality of LED chips in the chip clusters in the region in a predetermined sequence; and arranging the plurality of LED chips in the chip clusters in other regions symmetrically to the plurality of LED chips in the chip clusters in the predetermined region.

* * * * *